N. S. WRIGHT.
FLUID GAGE.
APPLICATION FILED OCT. 25, 1913.

1,129,265. Patented Feb. 23, 1915.

Witnesses
Geo. J. Heber
V. J. Lowrick

Inventor
N. S. WRIGHT
By Watson E. Coleman
Attorney

UNITED STATES PATENT OFFICE.

NOAH S. WRIGHT, OF EAST WORCESTER, NEW YORK.

FLUID-GAGE.

1,129,265.

Specification of Letters Patent.

Patented Feb. 23, 1915.

Application filed October 25, 1913. Serial No. 797,317.

*To all whom it may concern:*

Be it known that I, NOAH S. WRIGHT, citizen of the United States, residing at East Worcester, in the county of Otsega and State of New York have invented certain new and useful Improvements in Fluid-Gages, of which the following is a specification, reference being had to the accompanying drawings.

This invention relates to fluid gages and more particularly to gages of that type which are designed for use upon automobiles to indicate to the operator the quantity of oil in the engine crank case, and the primary object of the present invention is to provide an improved construction and arrangement of parts which will obviate all liability of the coagulated oil or foreign matter passing from the crank case into the float tube of the gage.

In its more specific aspect, my invention resides in the provision of an oil receiving cup or chamber and improved means for maintaining the same in fluid-tight engagement with the drain nipple of the crank case.

The invention has for an additional object to provide an oil receiving cup or receptacle having inner and outer spaced walls, a float tube in communication with the space between said walls, a nut adapted to be mounted in the inner wall of the cup and threaded in the nipple of the crank case, said nut being provided with an opening, and a cap threaded upon the outer wall and bearing against said nut to retain the cup in close frictional engagement with the nipple.

My invention has for another object to produce a device of the above character which may be easily and quickly applied to the crank case of automobiles now in general use, said device being simple in construction, highly efficient and reliable in actual use and capable of manufacture at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1:
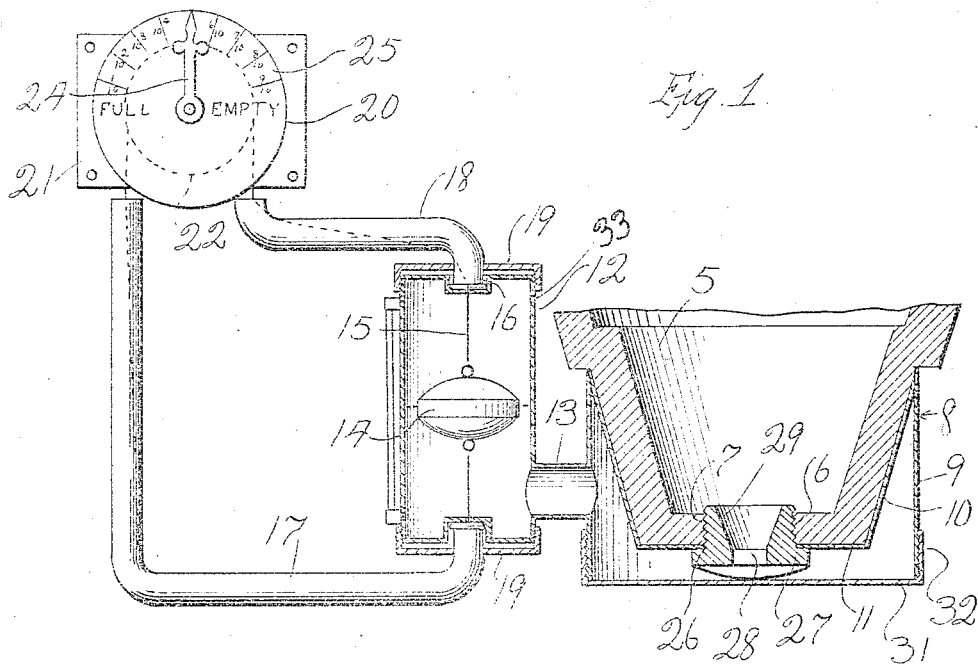
Figure 2:
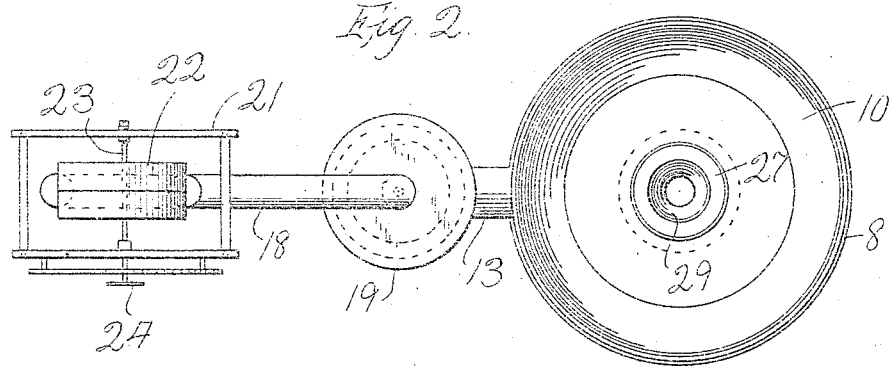
Figure 3:
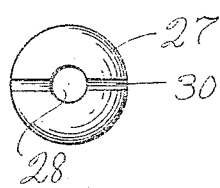

Figure 1 is a side elevation of a fluid gage embodying the present invention, the float tube and the oil receiving cup being shown in section; Fig. 2 is a top plan view; Fig. 3 is a detail end view of the nut.

Referring in detail to the drawing, 5 designates the nipple of an engine crank case through which the oil in which the cranks of the engine shaft operate may drain. The bottom of this nipple is provided with an opening 6 in which a nut 7, to be hereinafter specifically described is adapted to be threaded.

The invention forming the subject matter of the present application includes an oil receiving cup or receptacle generally designated by the numeral 8. This cup consists of an outer cylindrical wall 9 and an inner annular frusto-conical wall 10. This latter wall is integrally formed with or soldered to the upper edge of the outer annular wall 9. The smaller lower end of the inner wall 10 is closed by the horizontal base wall 11 which is disposed in spaced relation to the lower edge of the outer cylindrical wall 9.

12 designates a float tube which is connected by the neck 13 to the outer cylindrical wall 9 of the cup or receptacle, and a suitable float 14 operates in this tube. The ends of a cord, wire or other flexible element 15 are connected to the upper and lower sides respectively of this float. The upper and lower ends of the float tube 12 are centrally provided with circular sockets or recesses 16 to receive the ends of tubes 17 and 18 respectively. Suitable caps 19 are threaded upon the ends of the tube 12 to retain the tubes 17 and 18 in connection therewith. Through the tubes 17 and 18, the flexible element 15 extends. The other ends of said tubes are disposed in contiguous relation to an indicator 20 which embodies a suitable frame 21 in which a pulley 22 is arranged, said pulley being mounted upon the shaft 23. One end of this shaft is provided with a pointer 24 for movement with respect to the dial plate 25 which is mounted upon the frame 21. The pulley 22 is provided with a peripheral groove to receive the flexible element 15.

As above stated, the nut 7 is adapted to be threaded in the end of the nipple 5 of the crank case. This nipple is also of frusto-conical form and the inner wall 10 of the cup is held in close frictional engagement therewith, the bottom wall 11 being centrally provided with an opening 26 to receive the nut 7, said wall 11 of the cup serving as a washer between the head 27 of the nut and the opening in the nipple 5. The nut 7 is provided with a longitudinal opening 28, one end of which is flared or enlarged as at 29. This enlarged end of the opening opens into the interior of the nipple and obviates liability of the opening 28 being completely closed by waste matter accumulating therein. The end face of the enlarged head 27 is provided with a diametrically extending groove or slot 30 which traverses the opening 28 in the nut. It will further be observed from reference to Fig. 1 that the end face of the head 27 is convex which feature is of particular importance in the operation of the device as will be appreciated from the following description. The lower end of the outer cylindrical wall 9 of the cup is provided with exterior screw threads for engagement by the interiorly threaded flange 32 of the cap 31.

In the use of my invention, the cup or receptacle 8 is applied to the nipple 5 of the crank case of the engine as shown in Fig. 1, the threaded portion of the nut 7 being disposed through the opening in the bottom wall 11 of said cup and threaded in the opening of the nipple. It will be understood that the float tube 12 and the indicator 20 may be mounted in any desired manner and at any convenient point upon the body of the machine. The cap 31 is then threaded upon the outer cylindrical wall 9 of the cup and the body wall of said cap frictionally engages with the convex end face of the head 27 of the nut 7. It will be understood that the flange on the nut 27 engaging against the bottom of the inner wall 10 of the cup holds said wall at the edge of the opening 26 in fluid tight engagement with the bottom face of the nipple. When the cap 31 is threaded upon the lower end of the outer wall 9, the pressure of the nut 27 against the central portion of this cap tends to force the same downwardly, and draw the flange 32 on the outer edge of the cap inwardly, thus applying a pressure to the outer wall 9 and consequently forcing said wall at its upper edge together with the inner wall 10 into tight engagement against the periphery of the nipple. The cap 31 projects only a slight distance below the nipple and is therefore not liable to become broken or accidentally unthreaded by engagement with the ground in the movement of the machine over a rough surface, the frictional bearing engagement of said cap against the nut 27 also preventing said nut from working out of the threaded opening 7, thus preserving the fluid tight engagement of the bottom wall 11 of the cup with the nipple. Thus the escape of the oil between the cup and the nipple is effectually prevented. The float tube 12 is of course provided at its upper end with suitable air outlet apertures indicated at 33 so that the oil may rise therein and elevate the float. As the float is moved, the pointer 24 of the indicator is also moved with respect to the graduations upon the face of the dial plate 25 through the medium of the flexible connection 15 which is attached to said float.

From the foregoing, it is thought that the construction, manner of operation and several advantages of my improved fluid gage will be fully and clearly understood. As the device consists of but few parts which are all of very simple form, it will be appreciated that the same can be produced at small manufacturing cost. The invention is also applicable to the crank case of automobiles of the various makes now in general use, and requires no structural alterations to be made therein. The cup or receptacle may be easily and quickly applied to the nipple of the crank case or removed therefrom when it is desired to clean the case and drain the oil from the same.

While I have above described the particular form, construction and arrangement of the several elements employed, it is obvious that the invention is susceptible of considerable modification therein and I therefore reserve the right to resort to all such legitimate changes as may be fairly embodied within the spirit and scope of the invention, as claimed.

Having thus described the invention, what is claimed is:

1. The combination of the nipple of an engine crank case, a cup adapted to be applied to said nipple, means for establishing communication between the interior of the nipple and the cup, means closing one end of the cup and coöperating with said first named means to retain the cup in fluid-tight engagement with the nipple, and a liquid gage including a tube connected to said cup.

2. The combination of the nipple of an engine crank case, a cup adapted to be applied to said nipple, means for establishing communication between the interior of the nipple and the cup, a closure cap adapted to be threaded upon one end of said cup and coöperating with said means to hold the cup in fluid-tight engagement with the nipple, and a liquid gage including a tube connected to said cup.

3. The combination of the nipple of an engine crank case, a cup adapted to be applied to said nipple, a nut disposed through one wall of the cup and threaded in the nipple to retain the cup thereupon, said nut being provided with an opening establishing communication between the interior of the nipple and the cup, a closure cap removably engaged upon one end of the cup to close the same and coöperating with said nipple to hold the other end of the cup in fluid-tight engagement with the wall of the nipple, and a fluid gage including a tube connected to said cup.

4. The combination of the nipple of an engine crank case, a cup consisting of inner and outer spaced walls, said inner wall being adapted to surround and inclose said nipple, a base wall closing said inner wall at one end and provided with an opening, a nut adapted for insertion through said opening and having threaded engagement in the wall of the nipple, said nut being provided with an opening establishing communication between the interior of the nipple and the cup, a closure cap threaded upon one end of the outer wall of the cup and adapted to bear against said nut to hold the inner wall of the cup in close frictional engagement upon the nipple, and a fluid gage including a tube connected to the cup and in communication with the space between the cup walls.

5. The combination of the nipple of an engine crank case, a cup consisting of inner and outer spaced walls secured together at one of their ends, said inner wall being adapted to surround the nipple, a base wall closing the other end of said inner wall and provided with an opening, a nut adapted for insertion through said opening and having threaded engagement in the wall of the nipple, said nut being provided with a longitudinal opening, the end of the nut exteriorly of the nipple being convex and having a slot therein intersecting said opening, a closure cap removably engaged upon the end of the outer wall of the cup and bearing against the convex end face of the nut, the slot in the face of the nut opening into the space between the inner and outer cup walls, and a fluid gage including a tube connected to the cup and in communication with the space between the walls thereof.

6. The combination of the nipple of an engine crank case, a cup consisting of inner and outer walls connected together at one of their ends, a base wall closing the other end of said inner wall and spaced from the corresponding end of the outer wall, said inner wall being adapted to surround and frictionally engage with the wall of the nipple, said base wall being provided with an opening, a nut adapted for insertion through said opening and having threaded engagement in the wall of the nipple, said nut having a head formed on one end provided with a convex face, said nut being further provided with a longitudinal opening flared at one end and opening into the interior of the nipple, said convex face of the nut having a slot therein intersecting the other end of said opening, a closure cap threaded upon the end of the outer wall of the cup and adapted to bear against the convex face of said nut to force the inner wall of the cup into fluid-tight engagement with the wall of the nipple, and a fluid gage including a tube connected to the outer wall of the cup and in communication with the space between the cup walls.

In testimony whereof I hereunto affix my signature in the presence of two witnesses.

NOAH S. WRIGHT.

Witnesses:
    LOUIS DANTE,
    M. ROY HARTWELL.